United States Patent Office 3,142,668
Patented July 28, 1964

3,142,668
DYESTUFFS HAVING AN AZO, ANTHRAQUI-
NONE, NITRO, OR PHTHALOCYANINE
CHROMOPHORIC RADICAL AND A TRIA-
ZINE RING HAVING A 5- TO 6-MEMBERED-
HETEROCYCLIC-RING THIO SUBSTITUENT
Ian Durham Rattee and Frederick Andrew Waite, Manchester, England, assignors to Imperial Chemical Industries Limited, London, England, a corporation of Great Britain
No Drawing. Filed June 29, 1960, Ser. No. 39,457
Claims priority, application Great Britain July 8, 1959
6 Claims. (Cl. 260—153)

This invention relates to new dyestuffs and more particularly it relates to new dyestuffs which are valuable for colouring natural and artificial textile materials.

According to the invention there are provided the new dyestuffs which contain at least one group of the formula:

$$-\underset{\underset{R}{|}}{N}-T$$

Formula I wherein R represents a hydrogen atom or a substituted or unsubstituted alkyl radical or a cycloalkyl radical, T represents a 1:3:5-triazine ring which is attached to the nitrogen atom N through a carbon atom of the said ring and which carries one or two groups of the formula:

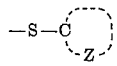

Formula II each of which is attached to a carbon atom of the 1:3:5-triazine ring, wherein Z represents the group of non-metallic atoms required to form a 5- or 6-membered heterocyclic ring, which may carry further substituents and which may form part of a condensed ring system.

Each of the groups of Formula I, as hereinbefore defined, is attached to a carbon atom present in the dyestuff. The said carbon atom may form part of an aryl residue present in the dyestuff or may form part of an alkyl chain which is directly attached to an aryl residue present in the dyestuff or is attached through a bridging atom or group. The dyestuff may be a member of any known dyestuff series and preferably it is a dyestuff of the azo, which may be monoazo or polyazo, nitro, anthraquinone or phthalocyanine series, and which may or may not contain at least one water-solubilising group such as alkylsulphone, a carboxylic acid or a sulphamyl group and preferably a sulphonic acid group. If desired the dyestuff may also contain coordinately bound metal such as coordinately bound copper, chromium or cobalt.

As examples of the 5- or 6-membered heterocyclic rings formed by the

group there may be mentioned furane, oxazole, pyrazole, selenazole, thiophene, pyran, pyridine, pyridazine and especially thiazole rings. The 5- or 6-membered heterocyclic rings may form part of a condensed ring system such as a quinoline, benzthiazole or naphthothiazole ring system. As examples of substituents which may be present in the heterocyclic rings there may be mentioned alkyl such as methyl and halogen such as chlorine.

It is preferred however that the sulphur atom joining the heterocyclic ring to the 1:3:5-triazine ring should be attached to a carbon atom of the heterocyclic ring which is adjacent to an oxygen, sulphur, nitrogen or selenium atom present in the said heterocyclic ring.

When the 1:3:5-triazine ring represented by T contains only one group of Formula II then the 1:3:5-triazine ring T may carry an additional substituent. As examples of such substituents which are attached to a carbon atom of the 1:3:5-triazine ring there may be mentioned halogen atoms such as chlorine and bromine, mercapto, substituted mercapto groups such as methylmercapto, carboxymethylmercapto and phenylmercapto, alkyl radicals such as methyl and ethyl, aryl radicals such as phenyl and tolyl, hydroxy, alkoxy radicals such as methoxy, ethoxy, propoxy and butoxy, aryloxy radicals such as phenoxy, sulphophenoxy and chlorophenoxy, amino groups, substituted amino groups such as methylamino, ethylamino, β-hydroxyethylamino, dimethylamino, diethylamino, di - (β - hydroxyethyl)amino, anilino, sulphoanilino, disulphoanilino, carboxyanilino and sulphonaphthylamino, dialkyldithiocarbamyl radicals such as diethyldithiocarbamyl and N - methyl - N - ethyldithiocarbamyl, nitro, cyano, thiocyano and sulphonic acid groups.

The substituted or unsubstituted alkyl radicals represented by R are preferably lower alkyl radicals such as methyl, ethyl, propyl, and butyl which may contain substituents such as hydroxy or methoxy groups. As an example of a cycloalkyl radical represented by R there may be mentioned the cyclohexyl radical.

According to a further feature of the invention there is provided a process for the manufacture of the new dyestuffs, as hereinbefore defined, which comprises reacting a dyestuff compound containing at least one group of the formula:

$$-\underset{\underset{R}{|}}{N}-T'$$

Formula III wherein R has the meaning stated above and T' represents a 1:3:5-triazine ring which is attached to the nitrogen atom N through a carbon atom of the said ring and which carries at least one halogen atom, with a compound of the formula:

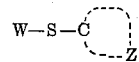

Formula I wherein Z has the meaning stated above and W represents a hydrogen or a metal atom.

As examples of the metal atoms represented by W there may be mentioned alkali metal atoms such as sodium and potassium.

As examples of the halogen atom or atoms which are attached to the 1:3:5-triazine ring there may be mentioned bromine and above all chlorine atoms.

This process of the invention may be conveniently brought about by adding an aqueous solution or suspension of the compound of Formula IV to a solution or suspension of the dyestuff compound containing at least one group of the Formula III in water or in a water-miscible organic liquid, for example ethanol or acetone, or in a mixture of water and a water-miscible organic liquid, stirring the mixture so obtained, preferably at a temperature between 20° and 90° C., if necessary adding sodium carbonate to maintain the pH of the mixture between 5 and 10, and filtering off the dyestuff which is precipitated. If desired sodium chloride and/or water can be added to ensure complete precipitation of all the dyestuff.

When the 1:3:5-triazine ring represented by T' carries two halogen atoms then it is possible by suitable choice of the reaction conditions to replace one or both of the said halogen atoms by groups of Formula II. In general it is found that the use of an excess of the compound of Formula IV and an increase in the reaction temperature results in replacement of both of the halogen atoms by the groups of Formula II.

The preferred compounds of Formula IV are the compounds which are represented by the formula:

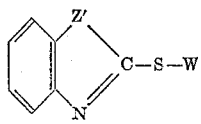

wherein W has the meaning stated above, Z' represents a sulphur or a selenium atom and the benzene ring may carry substituents.

As specific examples of the compounds of Formula IV which may be used in this process of the invention there may be mentioned the sodium salt of 2-mercaptobenzthiazole, the sodium salt of 2-mercapto-α-naphthothiazole, the potassium salt of 2-mercapto-β-naphthothiazole, 2-mercaptothiophene, 2-mercapto-4-methylthiazole, 2-mercapto-4-, 5-, 6- or 7-methylbenzthiazole, 2-mercapto-6-nitrobenzthiazole, 2-mercapto-5- or 6-chlorobenthiazole, 2-mercapto-4:5-benzo-1:3-thiazine, 2-mercaptobenzoxazole, 2-mercaptobenziminazole, 2-mercaptobenzselenazole, 2-mercaptopyrrole, 2-mercaptopyrrolidine, 2-mercaptopyridine, 4-mercaptopyridine, 2-mercaptopyrimidine, 2-mercaptoquinoline, 2-mercaptobenzthiazole-6-sulphonic acid, 2-mercapto-6-methoxybenzthiazole, 2-mercapto-6-ethoxybenzthiazole, 2-mercapto-6-acetylaminobenzthiazole, 2-mercapto-6-benzoylaminobenzthiazole, 2-mercapto-4:6-dimethylpyrimidine, 2-mercapto-4-methylquinoxaline, 2-mercapto-perinaphthoxazole, 2-mercaptobenzthiazole-5-sulphonic acid and 2-mercapto-6-ureidobenzthiazole.

The dyestuff compounds containing at least one group of Formula III which are used in this process of the invention may themselves be obtained by reacting a dyestuff compound containing at least one —NHR group with a 1:3:5-triazine containing at least 2 halogen atoms.

As examples of 1:3:5-triazines containing at least 2 halogen atoms which can be used to obtain the dyestuff compounds containing at least one halogen atom used in the process of the invention there may be mentioned cyanuric chloride, cyanuric bromide, 2:4-dichloro-1:3:5-triazine, 2-methoxy-4:6-dichloro-1:3:5-triazine, 2-ethoxy-4:6-dichloro-1:3:5-triazine, 2-methyl-4:6-dibromo-1:3:5-triazine, 2-phenyl-4:6-dichloro-1:3:5-triazine, 2-methylamino-4:6-dichloro-1:3:5-triazine, 2-ethylamino-4:6-dichloro-1:3:5-triazine, 2-phenoxy-4:6-dichloro-1:3:5-triazine, 2-(sulphophenoxy)-4:6-dichloro-1:3:5-triazine, 2-amino-4:6-dichloro-1:3:5-triazine, 2-anilino-4:6-dichloro-1:3:5-triazine, 2-(2'-, 3'-, or 4'-sulphoanilino)-4:6-dichloro-1:3:5-triazine, 2-(3':5'-disulphoanilino)-4:6-dichloro-1:3:5-triazine, 2-(2'-, 3'- or 4'-carboxyanilino)-4:6-dichloro-1:3:5-triazine, 2-mercapto-4:6-dichloro-1:3:5-triazine, 2-hydroxy-4:6-dichloro-1:3:5-triazine, 2-methylmercapto-4:6-dichloro-1:3:5-triazine and 2-phenylmercapto-4:6-dibromo-1:3:5-triazine.

Each of the —NHR groups present in the dyestuff compound is directly attached to a carbon atom of an aryl residue present in the dyestuff compound or each of the —NHR groups is attached to a carbon atom which forms part of an alkyl radical which is directly attached to an aryl residue present in the dyestuff compound or is attached through a linking atom or group. As examples of such linking atoms or groups there may be mentioned —O—, —S—, —NH—, —N-alkyl, —SO$_2$—, —SO$_2$NH—, —CONH— and

—SO$_2$N-alkyl

As examples of dyestuff compounds containing at least one —NHR group, as hereinbefore defined, which may be used to obtain the dyestuff compounds containing at least one group of Formula III there may be mentioned the compounds of the following classes without, however, limiting the classes to those specifically described.

(1) Monoazo compounds of the formula:

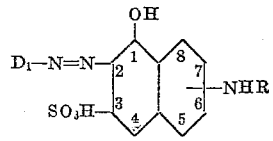

(V)

wherein $D_1$ represents an at most di-cyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this class are to be considered the related dyestuffs in which the NHR group, instead of being attached to the naphthalene nucleus, is attached to a benzoylamino or anilino groutp which is attached to a benzoylamino or anilino group which is at- cleus.

Particularly valuable dyestuffs are obtained from those wherein $D_1$ represents a sulphonated phenyl or naphthyl radical, especially those which contain a —SO$_3$H group in ortho position to the azo link; the phenyl radical may be further substituted for example, by halogen atoms such as chlorine, alkyl radicals such as methyl, acylamino groups such as acetylamino and alkoxy radicals such as methoxy.

(2) Disazo compounds of Formula V, wherein $D_1$ stands for a radical of the azobenzene, azonaphthalene or phenylazonaphthalene series and the naphthalene nucleus is substituted by the NHR group, and optionally by sulphonic acid as in class 1.

(3) Monoazo compounds of the formula:

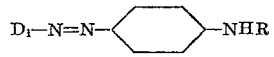

wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups.

(4) Mono- or disazo compounds of the formula:

H—N—D$_1$—N=N—K
     |
     R          (VI)

where $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrozolone) having the OH group o- to the azo group. $D_1$ preferably represents a radical of the benzene series containing a sulphonic acid group.

(5) Mono or disazo compounds of the formula:

D$_1$—N=N—K$_2$—NHR        (VII)

wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in α-position to the azo group.

(6) The metal complex, e.g. the copper, chromium and cobalt complex, compounds of those dyes of Formulae V, VI and VII (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

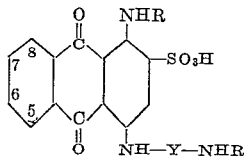

wherein the anthraquinone nucleus may contain an additional sulphonic acid group in the 5-, 6-, 7- or 8-position and Y represents a bridging group which is preferably a divalent radical of the benzene series, for example phenylene, diphenylene, or 4,4'-divalent stilbene or azobenzene radicals. It is preferred that Y should contain one sulphonic acid group for each benzene ring present.

(8) Phthalocyanine compounds of the formula:

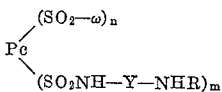

wherein Pc represents the phthalocyanine nucleus preferably of copper phthalocyanine, ω represents —OH and/or —NH$_2$, Y represents a bridging group, preferably an aliphatic, cycloaliphatic or aromatic bridging group, $n$ and $m$ each represent 1, 2 or 3 and may be the same or different provided that $n+m$ is not greater than 4.

(9) Nitro dyestuffs of the formula:

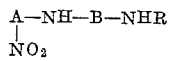

wherein A and B represent monocyclic aryl nuclei, the nitro group in A being ortho to the NH group.

In class 1:

6 - amino - 1 - hydroxy - 2' - sulphophenylazo)naphthalene-3-sulphonic acid,
6 - methylamine - 1 - hydroxy 2 -(4' - acetylamino-2'-sulphophenylazo)naphthalene-3-sulphonic acid,
8 - amino - 1 - hydroxy - 2 - (2' - sulphonphenylazo) naphthalene-3:6-disulphonic acid,
8 - amino - 1 - hydroxy - 2 - (4' - chloro-2'-sulphophenylazo)-naphthalene-3:5-disulphonic acid,
7 - amino - 2 - (2':5'-disulphophenylazo)-1-hydroxy-napthalene-3-sulphonic acid,
7 - methylamino-2-(2'-sulphophenylazo) - 1 - hydroxy-naphthalene-3-sulphonic acid,
7 - methylamino - 2 - (4'-methoxy-2'-sulphophenylazo)-1-hydroxynaphthalene-3-sulphonic acid,
8 - (3' - aminobenzoylamino) - 1 - hydroxy-2-(2'-sulphophenylazo)-naphthalene-3:6-disulphonic acid,
8 - amino - 1 - hydroxy - 2:2' - azonaphthalene-1':3:5':6-tetrasulphonic acid,
8 - amino - 1 - hydroxy - 2:2' - azonaphthalene - 1':3:5'-trisulphonic acid,
6 - amino - 1 - hydroxy - 2:2' - azonaphthalene-1'3:5'-trisulphonic acid,
6 - methylamino - 1 - hydroxy - 2:2' - azonaphthalene-1':3:5'-trisulphonic acid,
7 - amino - 1 - hydroxy - 2:2' - azonaphthalene - 1':3-disulphonic acid,
8 - amino - 1 - hydroxy - 2 - (4' - hydroxy-3'-carboxyphenylazo)-naphthalene-3:6-disulphonic acid,
6 - amino - 1 - hydroxy - 2 - (4' - hydroxy-3'-carboxyphenylazo)-naphthalene-3:5-disulphonic acid, In class 2:

8 - amino - 1 - hydroxy - 2 - [4'-(2''-sulphophenylazo)-2'-methoxy - 5' - methylphenylazo]naphthalene - 3:6-disulphonic acid,
8 - amino - 1 - hydroxy-2-[4'-(4''-methoxyphenylazo) 2'-carboxyphenylazo]naphthalene-3:6-disulphonic acid,
8 - amino - 1 - hydroxy - 2 - [4'-2''-hydroxy-3'':6''-disulpho - 1'' - naphthylazo) - 2' - carboxyphenylazo]naphthalene-3:6-disulphonic acid,
4,4' - bis(8'' - amino - 1'' - hydroxy - 3'':6'' - disulpho-2''-naphthylazo)-3:3'-demethoxydiphenyl,
6 - amino - 1 - hydroxy - 2 - [4'-(2'' - sulphophenylazo)-2' - methoxy - 5' - methylphenylazo]naphthalene - 3:5-disulphonic acid.

In class 3:

2 - (4' - amino - 2' - methylphenylazo)naphthalene - 4:8-disulphonic acid,
2 - (4' - amino - 2' - acetylaminophenylazo)naphthalene-5:7-disulphonic acid,
4 - nitro - 4' - (4'' - methylaminophenylazo)stilbene-2:2' - disulphonic acid,
4 - nitro - 4' - (4'' - amino-2''-methyl-5''methoxyphenylazo)-stilbene 1 2:2' - disulphonic acid,
4 - amino - 4'-(4'' - methoxyphenylazo)stilbene - 2:2'-disulphonic acid,
4 - amino - 2 - methylazobenzene - 2':5' - disulphonic acid.

In class 4:

1 - (2':5' - dichloro - 4' - sulphophenyl) - 3 - methyl-4-(3''-amino-4''-sulphophenylazo)-5-pyrazolone,
1 - (4' - sulphophenyl) - 3 - carboxy - 4 - (4''-amino-3''-sulphophenylazo)-5-pyrazolone,
1 - (2' - methyl - 5' - sulphophenyl) - 3 - methyl - 4-(4''-amino-3''-sulphophenylazo)-5-pyrazolone,
1 - (2' - sulphophenyl) - 3 - methyl - 4-(3''-amino - 4''-sulphophenylazo) - 5 - pyrazolone,
4 - amino - 4' - (3'' - methyl - 1'' - phenyl - 4'' - pyrazol-5'' - onyl - azo)stilbene - 2:2' - disulphonic acid,
4 - amino - 4' - (2'' - hydroxy - 3'':6''-disulpho - 1''-naphthylazo)-stilbene-2:2'-disulphonic acid,
8 - acetylamino - 1 - hydroxy - 2 - (3'-amino - 4' - sulphophenylazo)naphthalene-3:6-disulphonic acid,
7 - (3' - sulphophenylamino) - 1 - hydroxy - 2 - (4'-amino - 2' - carboxyphenylazo)naphthalene - 3 - sulphonic acid,
8 - phenylamino - 1 - hydroxy -2 - (4' - amino - 4'-sulphophenylazo)naphthalene - 3,6-disulphonic acid,
6 - acetylamino - 1 - hydroxy - 2 - (5' - amino - 2'-sulphophenylazo)naphthalene-3-sulphonic acid.

In class 5:

1 - (3' - aminophenyl) - 3 - methyl - 4 - (2':5' - disulphophenylazo)-5-pyrazolone,
1 - (3' - aminophenyl) - 3 - carboxy - 4 - (2' - carboxy-4' - sulphophenylazo)-5-pyrazolone,
4 - amino - 4' - [3'' - methyl - 4'' - (2''':5'''-disulphophenylazo) - 1'' - pyrazol - 5''-onyl]-stilbene-2:2-disulphonic acid,
1 - (3' - aminophenyl) - 3 - carboxy - 4 - [4'' - (2''':5'''-disulphophenylazo) - 2'' - methoxy - 5'' - methylphenylazo]-5-pyrazolone.

In class 6:

The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 6-methylamino-1-hydroxy-2-(2'- carboxy-5'-sulphophenylazo)naphthalene-3-sulphonic acid,

The copper complex of 8-amino-1-hydroxy-2-[4'-(2''-sulphophenylazo)-2'-methoxy-5'-methylphenylazo]-naphthalene-3:6-disulphonic acid, The copper complex of 6-amino-1-hydroxy-2-[4'-(2''':5''-disulphophenylazo)-2'-methoxy-5'-methylphenylazo]-naphthalene-3:5-disulphonic acid, The copper complex of 1-(3'-amino-4'-sulphophenyl)-3-methyl-4-[4''-(2''':5'''-disulphophenylazo)-2''-methoxy-5''-methylphenylazo]-5-pyrazolone, The copper complex of 7-(4'-amino-3'-sulphoanilino)-1-hydroxy-2-[4''-(2''':5'''-disulphophenylazo)-2''-methoxy-5''-methylphenylazo]naphthalene-3-sulphonic acid, The copper complex of 6-(4'-amino-3'-sulphoanilino)-1-hydroxy-2-(2''-carboxyphenylazo)naphthalene-3-sulphonic acid, The 1:2-chromium complex of 7-amino-6'-nitro-1:2'-dihydroxy-2:1'-azonaphthalene-3:4'-disulphonic acid, The 1:2-chromium complex of 6-amino-1-hydroxy-2-(2'-carboxyphenylazo)naphthalene-3-sulphonic acid, The 1:2-chromium complex of 8-amino-1-hydroxy-2-(4'-nitro-2'-hydroxyphenylazo)naphthalene-3:6-disulphonic acid, The 1:2-cobalt complex of 6-(4'-amino-3'-sulphoanilino)-1-hydroxy-2-(5''-chloro-2''-hydroxyphenylazo)naphthalene-3-sulphonic acid, The 1:2-chromium complex of 1-(3'-amino-4'-sulphophenyl)-3-methyl-4-(2''-hydroxy-4''-sulpho-1''-naphthylazo)-5-pyrazolone, The 1:2-chromium complex of 7-(4'-sulphoanilino)-1-hydroxy-2-(4''-amino-2''-carboxyphenylazo)naphthalene-3-sulphonic acid, The 1:2-chromium complex of 1-(3'-aminophenyl)-3-methyl-4-(4''-nitro-2''-carboxyphenylazo)-5-pyrazolone In class 7:

1-amino-4-(3'-amino-4'-sulphoanilino)anthraquinone-2-sulphonic acid, 1-amino-4-(4'-amino-3'-sulphoanilino)antharquinone-2:5-disulphonic acid, 1-amino-4-[4'-(4''-amino-3''-sulphophenyl)anilino]-antharquinone-2:5-disulphonic acid, 1-amino-4-[4'-(4''-amino-2''-sulphophenylazo)anilino]-anthraquinone-2:5-disulphonic acid, 1-amino-4-(4'-methylamino-3'-sulphoanilino)anthraquinone-2-sulphonic acid.

In class 8:

3-(3'-amino-4'-sulphophenyl)sulphamyl copper phthalocyanine-tri-3-sulphonic acid, Di-4-(3'-amino-4'-sulphophenyl)sulphamyl copper phthalocyanine-di-4-sulphonic acid, 3-(3'-aminophenylsulphamyl)-3-sulphamyl-copper phthalocyanine-di-3-sulphonic acid.

In class 9:

4-amino-2'-nitro-diphenylamine-3:4'-disulphonic acid.

Specific examples of dyestuff compounds containing at least one group of Formula III which can be used in this process of the invention are described in British specifications Nos. 209,723, 298,494, 467,815, 503,609, 772,030, 774,925, 775,308, 780,591, 781,930, 784,221, 785,120, 785,222, 802,935, 803,473, 805,565, 825,377, 826,405, 828,353, 829,042, 832,400, 833,396, 834,304, 836,248, 836,647, 837,035, 837,124, 837,953, 837,985 and 837,990 and in Belgian specifications Nos. 556,092, 558,801, 558,816, 558,817, 558,884, 558,957, 559,782, 559,945, 560,791, 560,792, 560,793, 560,794, 560,795, 563,439, 563,862, 569,115, 570,122, 570,343, 571,238, 571,523, 571,893, 571,942, 572,833, 572,967 and 581,401, and in United States Patent No. 2,258,977.

According to a further feature of the invention there is provided a modified process for the manufacture of the new dyestuffs which are azo dyestuffs containing at least one group of Formula I which comprises diazotising a primary amine or the corresponding sulphamic acid and coupling the diazo compound so obtained with a coupling component, the primary amine and/or the coupling component containing at least one group of Formula I.

This modified process of the invention may be conveniently brought about by adding sodium nitrite to a solution or suspension of the primary amine, which can be an aminoazo compound (or the corresponding sulphamic acid), in a dilute aqueous solution of hydrochloric acid and adding the so obtained solution or suspension of the diazo compound to a solution of the coupling component and filtering off the azo dyestuff which is precipitated. If desired sodium chloride can be added to ensure complete precipitation of all the azo dyestuff.

The primary amine, or the corresponding sulphamic acid, used in this modified process of the invention can be a member of any of the known series of diazotisable primary amines but preferably it is a primary amine of the benzene or naphthalene series which optionally contain an arylazo group. The coupling component used in this modified process of the invention can be a member of any of the known series of coupling components but preferably it is a coupling component of the acylacetarylide, 5-pyrazolone, phenol, naphthol or arylamine series.

Those primary amines, or the corresponding sulphamic acid, and coupling components which contain at least one group of Formula I may themselves be obtained by treating the corresponding primary amine, or sulphamic acid, or coupling component containing at least one —NHR group with (a) a 1:3:5-triazine which carries at least one halogen atom and at least one group of Formula II, or (b) a 1:3:5-triazine which carries at least 2 halogen atoms and then with a compound of Formula IV.

According to a further feature of the invention there is provided an alternative process for the manufacture of the new dyestuffs, as hereinbefore defined, which comprises reacting a dyestuff compound containing at least one —NHR group, wherein R has the meaning stated above, with a 1:3:5-triazine which carries at least one halogen atom and at least one group of Formula II, as hereinbefore defined.

This alternative process of the invention may be conveniently brought about by adding a solution of the said dyestuff compound in water or in a water-soluble organic liquid or in a mixture of water and a water-soluble organic liquid to a solution or suspension of the said 1:3:5-triazine in water and/or a water-miscible organic liquid, stirring the mixture, preferably at a temperature between 0° C. and 90° C., adding sodium carbonate to maintain the pH of the mixture between 5 and 10, and filtering off the dyestuff which is precipitated. If necessary water and/or sodium chloride can be added to ensure complete precipitation of all the dyestuff.

The 1:3:5-triazines carrying at least one halogen atom and at least one group of Formula II may themselves be obtained by reacting a 1:3:5-triazine carrying at least two halogen atoms with a compound of Formula IV.

According to a further feature of the invention there is provided a modified process for the manufacture of the new dyestuffs, as hereinbefore defined, wherein the 1:3:5-triazine ring represented by T carries one group of Formula II and one hydroxy group, alkoxy radical, aryloxy radical, mercapto or alkyl or aryl substituted mercapto group or a substituted or unsubstituted amino group or a thiocyano or sulphonic acid group, which comprises reacting a new dyestuff containing a group of Formula II and a halogen atom attached to the 1:3:5-triazine ring, with a compound of the formula: W—Q wherein W represents a hydrogen or a metal atom and Q represents a hydroxy group, alkoxy radical, aryloxy radical, mercapto or alkyl or aryl substituted mercapto group or a substituted or unsubstituted amino group or a thiocyano or sulphonic acid groups.

This modified process of the invention may be conveniently brought about by stirring a mixture of the compound of the formula: W—Q and the new dyestuff, as hereinbefore defined, in water, or in a water-miscible organic liquid or in mixture of water and a water-miscible organic liquid, preferably at a temperature between 0° and 100° C. adding sodium carbonate to maintain the pH of the mixture between 5 and 10, and filtering off the dyestuff which is precipitated. If necessary water and/or sodium chloride can be added to ensure complete precipitation of all the dyestuff.

As examples of compounds of the formula: W—Q which may be used in this alternative process of the invention there may be mentioned methanol, phenol, ammonia, methylamine, diethylamine, aniline, orthanilic acid, metanilic acid, sulphanilic acid, sodium sulphite, potassium thiocyanate, methyl mercaptan, sodium hydroxide, phenyl mercaptan, aniline 3:5-disulphonic acid and anthranilic acid.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates and dialkylmetanilic acid such as sodium diethylmetanilate, which is preferably used in conjunction with sodium hydrogen sulphate.

One preferred class of the new dyestuffs of the invention are the water-soluble dyestuffs which contain at least one water-solubilising group, which is preferably a sulphonic acid group, and which contain one or two groups of the formula:

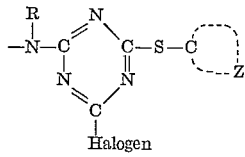

wherein R and Z have the meanings stated above, and halogen represents a bromine atom or preferably a chlorine atom.

A second preferred class of the new dyestuffs of the invention are the water-solube dyestuffs which contain at least one water-solubilising group, which is preferably a sulphonic acid group, and which contain one or two groups of the formula:

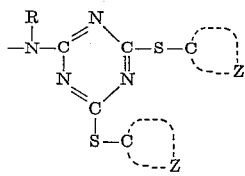

wherein R and Z have the meanings stated above.

A third preferred class of the new dyestuffs of the invention are the water-soluble dyestuffs which contain at least one water-solubilising group, which is preferably a sulphonic acid group, and which contain one or two groups of the formula:

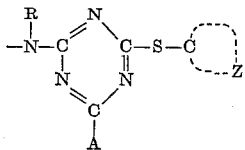

wherein R and Z have the meanings stated above and A represents an amino or substituted amino group, which is preferably a sulphonated phenylamino group, such as a 2-sulphoanilino, 3-sulphoanilino, 4-sulphoanilino or 2:5- or 3:5-disulphoanilino group.

A fourth preferred class of the new dyestuffs of the invention are the water-soluble dyestuffs which contain at least one water-solubilising group, which is preferably a sulphonic acid group, and which contain one or two groups of the formula:

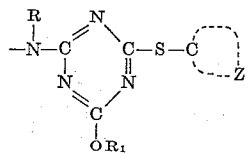

wherein R and Z have the meanings stated above and $R_1$ is an alkyl radical, which is preferably a methyl radical.

In the above classes the

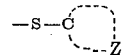

group preferably represents the group of the formula:

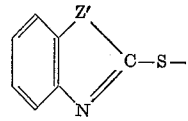

wherein Z', represents a sulphur or a selenium atom and the benzene ring may carry substituents.

The new dyestuffs, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to light and to wet treatments such as washing.

The new dyestuffs which contain water-solubilising groups, for example sulphonic acid and carboxylic acid groups, which render them soluble in water are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent, can be used.

For example the cellulose textile material can be coloured by treating the cellulose textile material with an aqueous solution or suspension of the acid-binding agent and then immersing the so-treated cellulose textile material in a dyebath comprising a solution of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the new dyestuffs, as hereinbefore defined, which also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution of the dyestuffs is not critical but it is preferred to use between 0.1% and 10% of the acid-binding agent based on the total weight of the aqueous solution. If desired the aqueous solution or suspension of the acid-binding agent may also contain further substances, for example electrolytes such as sodium chloride and sodium sulphate.

The aqueous solution of one or more of the said dyestuffs may also contain substances which are known to assist the application of dyestuffs to textile materials, for example sodium chloride, sodium sulphate, urea, dispersing agents, surface-active agents, sodium alginate or an emulsion of an organic liquid, for example trichloroethylene in water.

Alternatively the cellulose textile materials can be printed with a printing paste containing one or more of the new dyestuffs of the invention.

This may be conveniently brought about by applying a printing paste containing one or more of the said dyestuffs, to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C. before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

Those new dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent, for example the sodium salt of sulphonated naphthalene formaldehyde condensation products, sulphosuccinic acid esters, Turkey Red Oil, alkyl phenol/ethylene oxide condensation products, soap and similar surface-active materials with or without protective colloids such as dextrin, British gum and water-soluble proteins. If desired the aqueous paste of the dyestuff so obtained may be dried to form a re-dispersible powder which may be converted to a non-dusting powder by any of the processes known for forming non-dusting powders.

The new dyestuffs, as hereinbefore defined, can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

Alternatively the new dyestuffs can be applied to textile materials, which are preferably cellulose textile materials, in conjunction with a treatment with a resin-forming composition and an acid-catalyst whereby the textile material is simultaneously coloured and rendered resistant to creasing. This colouring process may be conveniently carried out by padding or printing the textile material with an aqueous solution containing (a) a new dyestuff, as hereinbefore defined, (b) a resin-forming composition and (c) an acid-catalyst, optionally drying the treated textile material, and subsequently heating the textile material at a temperature above 100° C., preferably at a temperature between 130° and 170° C.

As examples of resin-forming compositions there may be mentioned epoxy resins, polyisocyanates, condensates of formaldehyde with cresols or with acrolein, and, in particular mixtures comprising the methylol derivatives or lower alkyl ethers of methylol derivatives of monomeric or polymeric compounds containing a plurality of amino or mono substituted amino groups said compounds being known from the art or used in practice for the formation of resins by condensation with formaldehyde.

Such compounds include, for example, monomeric nitrogen compounds such as urea, thiourea, substituted ureas and thioureas, dicyandiamide, dicyandiamidine, biguanides, amides, carbamates, allophanates and heterocyclic compounds such as aminotriazines, urons, ureins, ureides, imidazolidones, triazones and hydantoins, or mixtures of such compounds, and polymeric nitrogen compounds such as the polymeric amides made by the reaction of dibasic acids with diamines. The lower alkyl ethers of the methylol derivatives of these compounds include for example the methyl, ethyl, propyl and butyl ethers.

The quantity of the resin-forming composition which is present in the aqueous solution used in this colouring process usually amounts to between 3% and 30% by weight of the aqueous solution and is preferably between 5% and 20% by weight of the aqueous solution.

As examples of acid-catalysts there may be mentioned salts from weak bases and mineral acids such as zinc chloride, ammonium sulphate, ammonium nitrate, ammonium chloride and magnesium chloride and mineral acid salts of organic amines, which are preferably primary or secondary organic amines which contain at least one alkyl chain carrying at least one hydroxy group. As specific examples of such primary or secondary amines containing one or two hydroxyalkyl groups there may be mentioned β-hydroxyethylamine N-methyl-N-(β-hydroxyethyl)amine, N-ethyl - N - (β-hydroxyethyl)amine, γ-hydroxypropylamine, β-hydroxypropylamine, β-, γ- or δ-hydroxy-n-butylamine, N:N - di(β-hydroxyethyl)amine, N:N - di(β-hydroxypropyl)amine, N-(β-hydroxyethyl)-aniline or -benzylamine, β:γ-dihydroxypropylamine, N-methylglucamine (also known as N-methyl-N-pentahydroxy-n-hexylamine), N-ethylglucamine, N-(β-hydroxyethyl)glucamine, N - methyl - N - (β:γ-dihydroxypropyl)-amine and 2-amino-1:2:3-propanetriol.

The invention is illustrated but not limited by the following examples in which the parts and percentages are by weight:

EXAMPLE 1

A solution of 2.6 parts of the sodium salt of 2-mercaptobenzthiazole in 40 parts of water is added with stirring to a solution of 8.95 parts of the trisodium salt of 7-(2'-sulphophenylazo) - 1 - (4":6"-dichloro-1":3":5"-triazin-2"-ylamino)-8-naphthol-3:6-disulphonic acid (which may be obtained as described in Example 1 of British Specification No. 785,222) in 350 parts of water and the resulting mixture is stirred for 3 hours at a temperature between 20° C. and 22° C. 60 parts of sodium chloride are then added and the dyestuff which is precipitated is filtered off. The filter cake so obtained is mixed with 0.49 parts of disodium hydrogen phosphate and 1.0 part of potassium dihydrogen phosphate and the mixture is dried at a temperature between 20° and 25° C. On analysis the dyestuff is found to contain 5 sulphur atoms and 1 organically bound chloride atom for each molecule of dyestuff. When applied to cellulose textile materials in conjunction with a treatment with an acid-binding agent the dyestuff yields red shades possessing excellent fastness to washing. The following table gives further examples of the new dyestuffs of the invention which are obtained when the 8.95 parts of the trisodium salt of the aminoazo compound used in Example 1 are replaced by equivalent amounts of the sodium salts of the monoazo compounds which are obtained by condensing cyanuric chloride with the aminoazo compound listed in the second column of the table, and/or the 2.6 parts of the sodium salt of 2-mercaptobenzthiazole are replaced by equivalent amounts of the sodium salt of the heterocyclic compounds listed in the third column of the table. The fourth column of the table indicates the shades obtained when the dyestuffs are applied to cellulose textile materials in conjunction with a treatment with an acid-binding agent.

| Example | Aminoazo Compound | Heterocyclic Compound | Shade |
|---|---|---|---|
| 2 | Copper complex of 1-amino-8:2'-dihydroxy-7-(phenylazo)naphthalene-3:5':6-trisulphonic acid. | 2-mercaptobenzthiazole | Violet. |
| 3 | 1-amino-7-[4'-(phenylazo)-2'-methoxy-5'-methylphenylazo]-8-naphthol-3:2":6-trisulphonic acid. | do | Blue. |
| 4 | 1-(3'-aminophenyl)-3-carboxy-4-(1":5"-disulphonaphth-2"-ylazo)-5-pyrazolone. | do | Yellow. |
| 5 | Copper complex of 2-amino-5:2'-dihydroxy-6-(phenylazo)naphthalene-1:7:5'-trisulphonic acid. | do | Rubine. |
| 6 | 1-benzoylamino-7-(3'-aminophenylazo)-8-naphthol-3:6:6'-trisulphonic acid. | do | Red. |
| 7 | 1-amino-7-(2'-sulphophenylazo)-8-naphthol-3:6-disulphonic acid | 2-mercaptobenzoxazole | Bluish-red. |
| 8 | do | 2-mercaptobenzimidazole | Do. |
| 9 | do | 2-mercaptopyridine | Do. |
| 10 | do | 4-mercaptopyridine | Do. |
| 11 | do | 2-mercaptobenzselenazole | Do. |
| 12 | do | 2-mercapto-6-methoxybenzthiazole | Do. |
| 13 | do | 2-mercapto-6-nitrobenzthiazole | Do. |
| 14 | do | 2-mercapto-6-acetylaminobenzthiazole | Do. |
| 15 | do | 2-mercapto-5-methylbenzthiazole | Do. |
| 16 | do | 2-mercapto-4:5-dihydrothiazole | Do. |
| 17 | do | 2-mercapto-4:6-dimethylpyrimidine | Do. |
| 18 | do | 2-mercapto-4-methylquinoxaline | Do. |
| 19 | do | 2-mercapto-perinaphthoxazole | Do. |
| 20 | do | 2-mercaptobenzthiazole-5-sulphonic acid | Do. |
| 21 | do | 2-mercapto-6-chlorobenzthiazole | Do. |
| 22 | do | 2-mercaptobenzthiazole-5-carboxylic acid | Do. |
| 23 | do | 2-mercaptobenzthiazole-6-sulphonic acid | Do. |
| 24 | 1-amino-7-(phenylazo)-8-naphthol-3:6-disulphonic acid | 2-mercaptobenzthiazole | Do. |
| 25 | 2-(4'-amino-2'-methylphenylazo)-naphthalene-4:8-disulphonic acid | do | Yellow. |
| 26 | 2-amino-6-(2'-sulphophenylazo)-5-naphthol-7-sulphonic acid | do | Orange. |
| 27 | 2-amino-7-(2'-sulphophenylazo)-8-naphthol-6-sulphonic acid | do | Do. |
| 28 | 1-(2':5'-dichloro-4'-sulphophenyl)-3-methyl-4-(3"-amino-6"-sulphophenylazo)-5-pyrazolone. | 2-mercaptobenzselenazole | Yellow. |
| 29 | 1-(2'-chloro-5'-sulphophenyl)-3-methyl-4-(3"-amino-6"-sulphophenylazo)-5-pyrazolone. | do | Do. |
| 30 | 2-amino-6-(2'-sulpho-4'-methoxyphenylazo)-5-naphthol-7-sulphonic acid. | do | Scarlet. |
| 31 | 2-amino-7-(2'-sulpho-4'-methoxyphenylazo)-8-naphthol-6-sulphonic acid. | 2-mercaptobenzthiazole | Red. |
| 32 | 2-methylamino-7-(2'-sulpho-4'-methoxyphenylazo)-8-naphthol-6-sulphonic acid. | do | Do. |
| 33 | 2-amino-5-hydroxy-6:2'-azonaphthalene-7:1':5'-trisulphonic acid | do | Orange. |
| 34 | 2-methylamino-5-hydroxy-6:2'-azonaphthalene-7:1':5'-trisulphonic acid. | do | Do. |
| 35 | 1:2-chromium complex of 2-amino-6-(2'-carboxyphenylazo)-5-naphthol-7-sulphonic acid. | do | Brown. |
| 36 | do | 2-mercaptobenzselenazole | Do. |
| 37 | do | 2-mercaptobenzoxazole | Do. |
| 38 | do | 2-mercapto-6-methoxybenzthiazole | Do. |
| 39 | 4-nitro-4'-(4"-N-methylaminophenylazo)stilbene-2:2'-disulphonic acid | 2-mercaptobenzthiazole | Reddish-yellow. |
| 40 | 1:2-chromium complex of 6-amino-1:2'-dihydroxy-6'-nitro-2:1'-azonaphthalene-3:4'-disulphonic acid. | do | Black. |

| Example | Aminoazo Compound | Heterocyclic Compound | Shade |
|---|---|---|---|
| 41 | 2-(3'-amino-6'-sulphophenylazo)-1-naphthol-3:6-disulphonic acid | 2-mercaptobenzthiazole | Reddish-orange. |
| 42 | 2-amino-6-(3'-amino-6'-sulphophenylazo)-5-naphthol-7-sulphonic acid | ___do___ | Orange. |
| 43 | 2-amino-6-[2'-sulpho-4'-(4''-sulphophenylazo)phenylazo]-5-naphthol-7-sulphonic acid. | ___do___ | Red. |
| 44 | 2-amino-5-hydroxy-6:2'-azonaphthalene-7:4':8'-trisulphonic acid | ___do___ | Scarlet. |
| 45 | 2-amino-5-hydroxy-6:2'-azonaphthalene-7:5':7'-trisulphonic acid | ___do___ | Do. |
| 46 | 2-(4'-amino-3'-sulphophenylamino)-6-[2''-sulpho-4''-(p-sulphophenylazo)phenylazo]-5-napthol-7-sulphonic acid. | ___do___ | Violet. |
| 47 | 2-amino-7-(3'-amino-6'-sulphophenylazo)-8-napthol-6-sulphonic acid | ___do___ | Reddish-orange. |
| 48 | 2-amino-8-hydroxy-7:2'-azonaphthalene-6:4':8'-trisulphonic acid | ___do___ | Red. |
| 49 | 2-amino-8-hydroxy-7:2'-azonaphthalene-6:1':5'-trisulphonic acid | ___do___ | Do. |
| 50 | 1-amino-7-(3'-sulphophenylazo)-8-naphthol-3:6-disulphonic acid | ___do___ | Bluish-red. |
| 51 | 1-amino-7-(2'-sulpho-4'-chlorophenylazo)-8-naphthol-3:6-disulphonic acid. | ___do___ | Do. |
| 52 | 1-amino-7-(2'-sulpho-4'-methoxyphenylazo)-8-naphthol-3:6-disulphonic acid. | ___do___ | Rubine. |
| 53 | 1-amino-7-(3'-amino-6'-sulphophenylazo)-8-naphthol-3:6-disulphonic acid. | ___do___ | Bluish-red. |
| 54 | 1-amino-7-(2'-sulphophenylazo)-8-naphthol-4:6-disulphonic acid | ___do___ | Red. |
| 55 | 1-amino-8-hydroxy-7:2'-azonaphthalene-3:6:1'-trisulphonic acid | ___do___ | Rubine. |
| 56 | 1-amino-7-(4'-sulphophenylazo)-8-naphthol-4:6-disulphonic acid | ___do___ | Bluish-red. |
| 57 | 2-(2'-acetylamino-4'-aminophenylazo) naphthalene-4:8-disulphonic acid | ___do___ | Reddish-yellow. |
| 58 | 2-(2'-methyl-4'-aminophenylazo)naphthalene-5:7-disulphonic acid | ___do___ | Do. |
| 59 | 2[2'-methyl-4'-(4''-amino-2''-methylphenylazo)phenylazo]napthalene-4:8-disulphonic acid. | ___do___ | Brownish-orange. |
| 60 | 1-(2'-sulphophenyl)-3-methyl-4-(3''-amino-6''-sulphophenylazo)-5-pyrazolone. | ___do___ | Yellow. |
| 61 | 1-(3'-aminophenyl)-3-methyl-4-(1'':5''-disulphonaphthyl-2''-azo)-5-pyrazolone. | ___do___ | Do. |
| 62 | 1-(4'-aminophenyl)-3-methyl-4-(1'':5''-disulphonaphthyl-2''-azo)-5-pyrazolone. | ___do___ | Do. |
| 63 | 1-(3'-amino-4'-sulphophenyl)-3-methyl-4-(1''-sulphonaphthyl-2''-azo)-5-pyrazolone. | ___do___ | Do. |
| 64 | 1-(4':8'-disulphonaphth-2'-yl)-3-methyl-4-(3''-amino-6''-sulphophenylazo)-5-pyrazolone. | ___do___ | Do. |
| 65 | 1-(3'-amino-6'-sulphophenylazo)-2-naphthol-6-sulphonic acid | ___do___ | Orange. |
| 66 | 1-(3'-amino-6'-sulphophenylazo)-2-naphthol-6:8-disulphonic acid | ___do___ | Do. |
| 67 | 2-(3'-amino-6'-sulphophenylazo)-1-naphthol-3-sulphonic acid | ___do___ | Do. |
| 68 | 2-(3'-amino-6'-sulphophenylazo)-1:8-dihydroxynaphthalene-3:6-disulphonic acid. | ___do___ | Bluish-red. |
| 69 | 1-(3'-amino-6'-sulphophenylazo)-2-amino-8-naphthol-6-sulphonic acid. | ___do___ | Red. |
| 70 | 1-acetylamino-7-(3'-amino-6'-sulphophenylazo)-8-naphthol-3:6-disulphonic acid. | ___do___ | Do. |
| 71 | 1-acetylamino-7-(3'-amino-6'-sulphophenylazo)-8-naphthol-4:6-disulphonic acid. | ___do___ | Do. |
| 72 | 1-benzoylamino-7-(3'-amino-6'-sulphophenylazo)-8-naphtol-3:6-disulphonic acid. | 2-mercaptobenzthiazole-5-sulphonic acid | Do. |
| 73 | 2-propionylamino-6-(3'-amino-6'-sulphophenylazo)-5-naphthol-7-sulphonic acid. | ___do___ | Yellowish-red. |
| 74 | 2-benzoylamino-6-(3'-amino-6'-sulphophenylazo)-5-naphthol-7-sulphonic acid. | ___do___ | Do. |
| 75 | 2-amino-7-(3'-amino-6'-sulphophenylazo)-8-naphthol-6-sulphonic acid. | ___do___ | Do. |
| 76 | 1-(4'-amino-2'-sulphophenylazo)-2-naphthol-8-sulphonic acid | ___do___ | Red. |
| 77 | 2-acetylamino-6-(4'-amino-2'-sulphophenylazo)-5-naphthol-7-sulphonic acid. | ___do___ | Yellowish-red. |
| 78 | 2-acetylamino-7-(4'-amino-2'-sulphophenylazo)-8-naphthol-6-sulphonic acid. | ___do___ | Red. |
| 79 | 1-(4'-amino-2'-sulphophenylazo)-2-amino-8-naphthol-6-sulphonic acid. | ___do___ | Bluish-red. |
| 80 | 1-acetylamino-7-(4'-amino-2'-sulphophenylazo)-8-naphthol-3:6-disulphonic acid. | 2-mercaptobenzthiazole | Violet. |
| 81 | 1-benzoylamino-7-(4'-amino-2'-sulphophenylazo)-8-naphthol-4:6-disulphonic acid. | ___do___ | Bordeaux. |
| 82 | 1-(3'-aminophenyl)-3-methyl-4-(2'':5''-disulphophenylazo)-5-pyrazolone. | ___do___ | Yellow. |
| 83 | 1-(3'-aminobenzoylamino)-7-(2'-sulphophenylazo)-8-naphthol-3:6-disulphonic acid. | ___do___ | Red. |
| 84 | 1-(4'-aminosulphonaphth-1'-ylazo)-4-(8''-sulphonaphth-1''-ylazo)naphthalene sulphonic acid. | ___do___ | Reddish-brown. |
| 85 | 1-amino-2-(4'-aminophenylazo)-7-(4''-sulphophenylazo)-8-naphthol-3:6-disulphonic acid. | ___do___ | Green. |
| 86 | 1-(4'-aminobenzoylamino)-7-(2''-sulphophenylazo)-8-naphthol-3:6-disulphonic acid. | ___do___ | Red. |
| 87 | 2-amino-6-[2'-methoxy-5'-methyl-4'-(2'':5''-disulphophenylazo)phenylazo]-5-naphthol-1:7-disulphonic acid. | ___do___ | Bluish-violet. |
| 88 | 2-(4'-sulphophenylamino)-7-(3''-amino-6''-sulphophenylazo)-8-naphthol-6-sulphonic acid. | 2-mercaptobenzthiazole-5-sulphonic acid | Brown. |
| 89 | Copper complex of 2-amino-6-[2'-methoxy-5'-methyl-4'-(2'':5''-disulphophenylazo)phenylazo]-5-naphthol-1:7-disulphonic acid. | ___do___ | Navy-blue. |
| 90 | ___do___ | 2-mercaptobenzthiazole | Do. |
| 91 | ___do___ | 2-mercaptobenzselenazole | Do. |
| 92 | ___do___ | 2-mercapto-β-naphthothiazole | Do. |
| 93 | ___do___ | 2-mercapto-α-napthothiazole | Do. |
| 94 | Copper complex of 2-amino-6-(2'-hydroxy-5'-sulphophenylazo)-5-naphthol-7-sulphonic acid. | 2-mercaptobenzthiazole | Rubine. |
| 95 | Copper complex of 2-amino-6-(2'-hydroxy-3':5'-disulphophenylazo)-5-naphthol-1:7-disulphonic acid. | ___do___ | Do. |
| 96 | Copper complex of 1-amino-7-(2'-hydroxy-3'-chloro-5'-sulphophenylazo)-8-naphthol-3:6-disulphonic acid. | ___do___ | Violet. |
| 97 | Copper complex of 1-(3'-amino-4'-sulphophenyl)-3-methyl-4-(2''-carboxy-4''-sulphophenylazo)-5-pyrazolone. | ___do___ | Greenish-yellow. |
| 98 | Copper complex of 1-(3'amino-4'-sulphophenyl)-3-methyl-4-(2''-hydroxy-3'':5''-disulphophenylazo)-5-pyrazolone. | ___do___ | Reddish-yellow. |
| 99 | Copper complex of 1-phenylamino-7-(2'-hydroxy-3'-amino-5'-sulphophenylazo)-8-naphthol-3:6-disulphonic acid. | ___do___ | Blue. |
| 100 | Copper complex of 1-phenylamino-7-(2'-carboxy-4'-aminophenylazo)-8-naphthol-3:6-disulphonic acid. | ___do___ | Greenish-blue. |
| 101 | Copper complex of 2-(4'-amino-3'-sulphophenyl)-6-(2''-hydroxy-3''-nitro-5''-sulphophenylazo)-5-naphthol-7-sulphonic acid. | ___do___ | Bluish-violet. |
| 102 | Copper complex of 2-(4'-amino-3'-sulphophenyl)-6-(2''-carboxyphenylazo)-5-naphthol-7-sulphonic acid. | ___do___ | Rubine. |
| 103 | 1:2-chromium complex of 1-(3'-aminophenyl)-3-methyl-4-(2''-carboxy-4''-sulphophenylazo)-5-pyrazolone. | ___do___ | Reddish-yellow. |

| Example | Aminoazo Compound | Heterocyclic Compound | Shade |
|---|---|---|---|
| 104 | 1:2-chromium complex of 2-amino-6-(2'-hydroxy-6'-nitro-4'-sulphonaphth-1'-ylazo)-5-naphthol-7-sulphonic acid. | 2-mercaptobenzthiazole | Greenish-black. |
| 105 | Copper complex of 2-amino-6-(2'-hydroxy-6'-nitro-4-'sulphonaphth-1'-ylazo)-5-naphthol-7-sulphonic acid. | do | Reddish blue. |
| 106 | 1:2-cobalt complex of 2-amino-6-(2'-hydroxy-6'-nitro-4'-sulphonaphth-1'-ylazo)-5-naphthol-7-sulphonic acid. | do | Brown. |
| 107 | Nickel complex of 2-amino-6-(2'-hydroxy-6'-nitro-4'-sulphonaphth-1'-ylazo)-5-naphthol-7-sulphonic acid. | do | Violet. |
| 108 | 1:2-chromium complex of 2-methylamino-6-(2'-hydroxy-6'-nitro-4'-sulphonaphth-1-'ylazo)-5-naphthol-7-sulphonic acid. | do | Black. |
| 109 | 1:2-chromium complex of 1-amino-7-(2'-hydroxy-6'-nitro-4'-sulphonaphth-1'-ylazo)-8-naphthol-3:6-disulphonic acids. | do | Greenish-black. |
| 110 | 1:2-cobalt complex of 1-(3'-aminophenyl)-3-carboxy-4-(2''-hydroxy-6''-nitro-4''-sulphonaphth-1''-ylazo)-5-pyrazolone. | do | Red. |
| 111 | 1:2-chromium complex of 2-(4'-amino-3'-sulphophenylamino)-6-(2''-hydroxy-3''-chloro-5''-sulphophenylazo)-5-naphthol-7-sulphonic acid. | do | Navy. |
| 112 | 1:2-chromium complex of 2-(3'-sulphophenylamino)-6-(2''-hydroxy-4''-aminophenylazo)-5-naphthol-7-sulphonic acid. | do | Bluish-grey. |

EXAMPLE 113

A solution of 19.6 parts of the trisodium salt of 1-amino - 4 - [4' - (4'':6'' - dichloro-1'':3'':5''-triazin-2''-yl)amino]anilinoanthraquinone-2:3':5 - trisulphonic acid (which may be obtained as described in Example 1 of British specification No. 781,930) in 400 parts of water is stirred at 20° C. and a solution of 5.2 parts of the sodium salt of 2-mercaptobenzthiazole in 50 parts of water is added during 15 minutes. The mixture is stirred at 20° C. until reaction is complete and sodium chloride is then added. The precipitated dyestuff is then filtered off, washed with brine solution and dried at 20° C.

When applied to cellulose textile materials in conjunction with a treatment with an acid-binding agent the dyestuff yields blue shades possessing excellent fastness to wet treatments.

EXAMPLE 114

In place of the 19.6 parts of the trisodium salt used in Example 113 there are used 17.0 parts of the disodium salt of 1 - amino-4-[3'-(4'':6''-dichloro-s-triazin-2''-yl) amino]anilinoanthraquinone-2:4'-disulphonic acid (which may be obtained as described in Example 2 of Belgian specification No. 556,092).

When applied to cellulose textile materials in conjunction with a treatment with an acid-binding agent the dyestuff so obtained yields reddish-blue shades possessing excellent fastness to wet treatments.

EXAMPLE 115

The dihalogenotriazinylamino derivatives of metal phthalocyanines obtained as described in Examples 1, 2, 3, 8 and 14 of British specification No. 805,562 are reacted with the sodium salt of 2-mercaptobenzthiazole by the method of Example 1 using one molecular proportion of the sodium salt of 2-mercaptobenzthiazole for each dihalogenotriazinylamino group present in the metal phthalocyanines. The dyestuffs so obtained when applied to cellulose textile materials in conjunction with a treatment with an acid-binding agent yield respectively greenish-blue, turquoise-blue, greenish-blue, greenish-blue and greenish-blue shades which possess excellent fastness to wet treatments.

EXAMPLE 116

A solution of 5.2 parts of the sodium salt of 2-mercaptobenzthiazole in 80 parts of water is added with stirring to a solution of 8.95 parts of the trisodium salt of 7-(2'-sulphophenylazo)-1-(4'':6''-dichloro - 1'':3'':5'' - triazin-2''-ylamino)-8-naphthol-3:6-disulphonic acid (which may be obtained as described in Example 1 of British specification No. 785,222) in 350 parts of water and the resulting mixture is stirred for 20 hours at a temperature between 25° C. and 30° C. The dyestuff which is precipitated is then filtered off and the filter cake so obtained is mixed with 0.49 part of disodium hydrogen phosphate and 1.0 part of potassium dihydrogen phosphate and the mixture is dried at a temperature between 20° C. and 25° C. On analysis the dyestuff is found to contain 7 sulphur atoms for each molecule of dyestuff.

When applied to cellulose textile materials in conjunction with a treatment with an acid-binding agent the dyestuff yields red shades possessing excellent fastness to washing.

The following table gives further examples of the new dyestuffs which are obtained when the 8.95 parts of the trisodium salt of the azo compound used in Example 116 are replaced by equivalent amounts of the sodium salts of the azo compounds which are obtained by condensing cyanuric chloride with the aminoazo compounds listed in the second column of the table and/or the 5.2 parts of the sodium salt of 2-mercaptobenzthiazole are replaced by equivalent amounts of the sodium salt of the heterocyclic compounds listed in the third column of the table. The fourth column of the table indicates the shades obtained when the dyestuffs are applied to cellulose textile materials in conjunction with an acid-binding agent.

| Example | Aminoazo Compound | Heterocyclic Compound | Shade |
|---|---|---|---|
| 117 | 1-amino-7-(2'-sulphophenylazo)-8-naphthol-3:6-disulphonic acid | 2-mercaptobenzoxazole | Bluish-red. |
| 118 | do | 2-mercaptopyridine | Do. |
| 119 | do | 2-mercaptobenzselenazole | Do. |
| 120 | 2-methylamino-6-(1':5'-disulphonaphth-2'-ylazo)-5-naphthol-7-sulphonic acid. | 2-mercaptobenzthiazole | Orange. |
| 121 | 2-amino-6-(2'-sulphophenylazo)-5-naphthol-7-sulphonic acid | do | Do. |
| 122 | 2-amino-7-(2'-sulphophenylazo)-8-naphthol-6-sulphonic acid | do | Do. |
| 123 | 1-amino-7-(3'-sulphophenylazo)-8-naphthol-3:6-disulphonic acid | do | Bluish-red. |
| 124 | 1-amino-7-(2'-sulpho-4'-methoxyphenylazo)-8-naphthol-3:6-disulphonic acid. | do | Rubine. |
| 125 | 1-amino-7-(3'-amino-6'-sulphophenylazo)-8-naphthol-3:6-disulphonic acid. | do | Bluish-red. |
| 126 | 1-amino-7-(2'-sulphophenylazo)-8-naphthol-4:6-disulphonic acid | do | Red. |
| 127 | 1-acetylamino-7-(3'-amino-6'-sulphophenylazo)-8-naphthol-3:6-disulphonic acid. | do | Do. |
| 128 | 2-amino-6-[2'-methoxy-5'-methyl-4'-(2'':5''-disulphophenylazo)]-5-naphthol-1:7-disulphonic acid. | do | Bluish-violet. |
| 129 | Copper complex of 2-amino-6-[2'-methoxy-5'-methyl-4'-(2'':5''-disulphophenylazo)]-5-naphthol-1:7-disulphonic acid. | do | Navy-blue. |
| 130 | 1-amino-7-(1'-sulphonaphth-2'-ylazo)-8-naphthol-3:6-disulphonic acid. | do | Bluish-red. |
| 131 | 1-(2':5'-dichloro-4'-sulphophenyl)-3-methyl-4-(4'-amino-2'-sulphophenylazo)-5-pyrazolone. | do | Yellow. |
| 132 | Copper complex of 1-amino-7-(2'-hydroxy-3'-chloro-4'-sulphophenylazo)-8-naphthol-3:6-disulphonic acid. | do | Purple. |

EXAMPLE 133

7.73 parts of the trisodium salt of 2-[8'-hydroxy-7'-(2''-sulphophenylazo) - 3':6' - disulphonaphth - 1' - ylamino]-4 - anilino-6-chloro-1:3:5-triazine and 2.84 parts of the sodium salt of 2-mercaptobenzthiazole are dissolved in 250 parts of water and the pH of the solution is adjusted to between 8 and 9 by the addition of an aqueous solution of sodium hydroxide. The solution is then stirred at 70° C. for 5 hours and finally at 90° C. for 4 hours. 37 parts of sodium chloride are then added, the solution is cooled to 30° C. and the dyestuff which separates out is filtered off, washed with acetone and dried.

On analysis the dyestuff is found to contain 32 carbon atoms, 8 nitrogen atoms and 5 sulphur atoms per molecule of dyestuff.

When the dyestuff is applied to cotton in conjunction with a treatment with an acid binding agent bluish red shades are obtained which have excellent fastness to washing.

EXAMPLE 134

6.43 parts of the disodium salt of 2-[5'-hydroxy-6'-(4''-methoxy - 2'' - sulphophenylazo)-7'-sulphonaphth-1'-ylmethylamino]-4-methoxy-6-chloro-1:3:5-triazine and 3.78 parts of the sodium salt of 2-mercaptobenzthiazole are dissolved in 250 parts of water and the pH of the solution is adjusted to between 8 and 9 by the addition of an aqueous solution of sodium hydroxide. The solution is then stirred at 50° C. for 12 hours. 12.5 parts of sodium chloride are added, the solution is cooled to 20° C. and the dyestuff which separates out is filtered off, washed with acetone and dried.

On analyses the dyestuff is found to contain 7 atoms of nitrogen and 4 atoms of sulphur per molecule of dyestuff.

When applied to cellulose textile materials in the presence of an acid-binding agent the dyestuff yields bright scarlet shades which have good fastness to washing.

EXAMPLE 135

8.1 parts of the trisodium salt of 2-[8'-hydroxy-7'-(2''-sulphophenylazo) - 3':6' - disulphonaphth-1'-ylamino]-4-diethylthiocarbamylthio-6-chloro - 1:3:5 - triazine (which may be obtained by condensing the trisodium salt of 2-[8'-hydroxy-7'-(2''-sulphophenylazo) - 3':6' - disulphonaphth-1'-ylamino]-4:6-dichloro-1:3:5-triazine with sodium diethyldithiocarbamate in aqueous medium) and 2.1 parts of the sodium salt of 2-mercaptobenzthiazole are dissolved in 250 parts of water and the pH of the solution is adjusted to between 8 and 9 by the addition of an aqueous solution of sodium hydroxide. The solution is stirred at 20° C. for 20 hours and the dyestuff which is precipitated is then filtered off, and washed with acetone. The solid so obtained is mixed with 1 part of a mixture (in the ratio of 1:1.77 by weight) of sodium hydrogen phosphate and potassium dihydrogen phosphate, and the resulting product is dried.

On analyses the dyestuff is found to contain 8 nitrogen atoms and 7 sulphur atoms per molecule of dyestuff.

When applied to cellulose textile materials in conjunction with a treatment with an acid-binding agent the dyestuff yields bluish-red shades which have good fastness to washing.

EXAMPLE 136

8.48 parts of the dyestuff of Example 1 and 2.14 parts of the sodium salt of aniline-3-sulphonic acid are dissolved in 250 parts of water, and the solution is then stirred at 40° C. for 8 hours. 37.5 parts of sodium chloride are added and the solution is cooled to 20° C. The precipitated dyestuff is then filtered off, washed with acetone and dried.

On analyses the dyestuff is found to contain 8 atoms of nitrogen and 6 atoms of sulphur per molecule of dye.

When applied to cellulose textile materials in conjunction with a treatment with an acid-binding agent the dyestuff yields bluish-red shades which have good fastness to washing.

The following table gives further examples of new dyestuffs of the invention which are obtained when the 8.48 parts of the dyestuff of Example 1 which are used in Example 136 are replaced by equivalent amounts of the dyestuffs listed in the second column of the table and/or the 2.14 parts of the sodium salt of aniline-3-sulphonic acid used in Example 136 are replaced by equivalent amounts of the sodium salt of the compound listed in the third column of the table. The fourth column of the table indicates the shades obtained when the dyestuffs are applied to cellulose in conjunction with a treatment with an acid-binding agent.

| Example | Dyestuff | Compound | Shade |
|---|---|---|---|
| 137 | Dyestuff of Example 1. | Phenol | Bluish-red. |
| 138 | do | Aniline-3:5-disulphonic acid. | Do. |
| 139 | Dyestuff of Example 3. | Aniline-4-sulphonic acid. | Blue. |
| 140 | Dyestuff of Example 6. | Aniline-3-carboxylic acid. | Red. |
| 141 | Dyestuff of Example 24. | Aniline-3-sulphonic acid. | Bluish-red. |
| 142 | Dyestuff of Example 25. | do | Yellow. |
| 143 | Dyestuff of Example 30. | do | |
| 144 | Dyestuff of Example 33. | 2-carboxyaniline-4-sulphonic acid. | Orange. |
| 145 | Dyestuff of Example 39. | Aniline-3-sulphonic acid. | Yellow. |
| 146 | Dyestuff of Example 40. | do | Black. |
| 147 | Dyestuff of Example 94. | do | Rubine. |
| 148 | Dyestuff of Example 99. | do | Blue. |

The following table gives further examples of new dyestuffs of the invention which are obtained when the 7.73 parts of the trisodium salt of the azo compound used in Example 133 are replaced by equivalent amounts of the sodium salts of the azo compounds which are obtained by condensing the aminoazo compound listed in the second column of the table with the triazine listed in the third column of the table. The fourth column of the table indicates the shades obtained when the dyestuffs are applied to cellulose textile materials in conjunction with a treatment with an acid-binding agent.

| Example | Aminoazo Compound | Triazine | Shade |
|---|---|---|---|
| 149 | 1-amino-7-[4'-(phenylazo)-2'-methoxy-5'-methylphenylazo]-8-napthol-3:2':6-trisulphonic acid. | 2-phenoxy-4:6-dichloro-1:3:5-triazine. | Blue. |
| 150 | 1-(3'-aminophenyl)-3-carboxy-4-(1'':5''-disulphonapth-2''-ylazo)-5-pyrazolone. | 2-(3'-sulphophenylamino)-4:6-dibromo-1:3:5- triazine | Yellow. |
| 151 | 1-benzoylamino-7-(3'-aminophenylazo)-8-naphthol-3:6:6'-trisulphonic acid. | 2-(3':5'-disulphophenylamino)-4:6-dichloro-1:3:5-triazine. | Red. |
| 152 | 2-(4'-amino-2'-methylphenylazo)-naphthalene-4:8-disulphonic acid. | 2-methoxy-4:6-dichloro-1:3:5-triazine. | Yellow. |
| 153 | 1-(2':5'-dichloro-4'-sulphophenyl)-3-methyl-4-(3''-amino-6''-sulphophenylazo)-5-pyrazolone. | 2-amino-4:6-dichloro-1:3:5-triazine. | Do. |
| 154 | 2-methylamino-5-hydroxy-6:2'-azonaphthalene-7:1':5'-trisulphonic acid. | 2-methylamino-4:6-dichloro-1:3:5-triazine. | Orange. |
| 155 | 4-Nitro-4'-(4''-N-methylaminophenylazo)-stilbene-2:2'-disulphonic acid. | 2-dimethylamino-4:6-dichloro-1:3:5-triazine. | Reddish-yellow. |
| 156 | 1-amino-8-hydroxy-7:2'-azonaphthalene-3:6:1'-trisulphonic acid. | 2-(4'-sulphoanilino)-4:6-dichloro-1:3:5-triazine. | Rubine. |
| 157 | 1-(3'-amino-6'-sulphophenylazo)-2-naphthol-6:8-disulphonic acid. | 2-methyl-4:6-dichloro-1:3:5-triazine. | Orange. |
| 158 | 1-amino-2-(4'-aminophenylazo)-7-(4''-sulphophenylazo)-8-naphthol-3:6-disulphonic acid. | 2-methylthio-4:6-dichloro-1:3:5-triazine. | Green. |
| 159 | 2-amino-6-(2'-sulphophenylazo)-5-naphthol-7-sulphonic acid. | 2-phenylthio-4:6-dichloro-1:3:5-triazine. | Orange. |
| 160 | 1-amino-7-(2'-sulphophenylazo)-8-naphthol-4:6-disulphonic acid | do | Red. |

EXAMPLE 161

A solution of 9.1 parts of the disodium salt of 1-amino-8-naphthol-3:6-disulphonic acid in 100 parts of water is added, during 30 minutes, to a suspension of 4.65 parts of cyanuric chloride in a mixture of 30 parts of acetone, 50 parts of ice and 50 parts of water. The resulting mixture is stirred for 1 hour at a temperature between 0° and 5° C. and a 10% aqueous solution of sodium carbonate is then added until the pH of the mixture is 7. A solution of 4.75 parts of the sodium salt of 2-mercaptobenzthiazole in 30 parts of water is then added and sodium carbonate is added until the pH of the mixture is between 8 and 9. The mixture is stirred for 1 hour at 35° C. then cooled to 0° C. and an aqueous solution of diazotised orthanilic acid (obtained by diazotising 4.1 parts of orthanilic acid in the normal manner) and 10 parts of sodium carbonate are added. The mixture is stirred for 2 hours at 0° C., 40 parts of sodium chloride are added and the precipitated dyestuff is filtered off and dried. The dyestuff so obtained is identical to the dyestuff of Example 1.

EXAMPLE 162

To a solution of 9.38 parts of 4-(4″:6″-dichloro-1″:3″:5″-triazin-2″-ylamino)-2′-hydroxy-5′-methylazobenzene (which may be obtained by condensing cyanuric chloride with 4-amino-2′-hydroxy-5′-methylazobenzene) in 400 parts of dioxan there is added a solution of 5.24 parts of 2-mercaptobenzthiazole in a mixture of 50 parts of water, 13.75 parts of a 2 N aqueous solution of sodium hydroxide and 150 parts of dioxan and the resulting mixture is then stirred for 5 hours at 20° C. 750 parts of water are added and the precipitated dyestuff is filtered off and dried.

When dispersed in aqueous medium the dyestuff dyes polyamide textile materials in yellow shades possessing excellent fastness to wet treatments.

EXAMPLE 163

A solution of 4.16 parts of the sodium salt of 2-mercaptobenzthiazole in 70 parts of water is added to a solution of 19.74 parts of the tetrasodium salt of a mixture of 1-amino-4-[4′-(4″-{4‴:6‴-dichloro-1‴:3‴:5‴-triazine-2‴-ylamino}phenylvinyl)anilino]anthraquinone-2:5:3′:2″ and 2:8:3′:2‴-tetrasulphonic acids (which may be obtained by condensing cyanuric chloride with a technical mixture of the tetrasodium salts of 1-amino-4-[4′-(4″-aminophenylvinyl)anilino]-anthraquinone 2:5:3′:2″ and 2:8:3′:2‴-tetrasulphonic acids) in 300 parts of water, and the resulting mixture is stirred for 2 hours at a temperature between 25° and 30° C. 30 parts of sodium chloride are then added and the precipitated dyestuff is filtered off, washed with a 5% aqueous solution of sodium chloride and dried.

On analysis the dyestuff is found to contain 6 atoms of sulphur and 1 atom of organically bound chlorine per molecule of dyestuff.

The dyestuff so obtained when applied to cellulose textile materials in conjunction with a treatment with an acid-binding agent yields bluish breen shades possessing excellent fastness to wet treatments.

The following table gives further examples of the new dyestuffs of the invention which are obtained when the 19.74 parts of the tetrasodium salt of the anthraquinone compound used in Example 163 are replaced by equivalent amounts of the sodium salts of the anthraquinone compounds obtained by condensing cyanuric chloride with the aminoanthraquinone listed in the second column of the table and/or the 4.16 parts of the sodium salt of 2-mercaptobenzthiazole used in Example 163 are replaced by equivalent amounts of the heterocyclic compounds listed in the third column of the table. The fourth column of the table indicates the shades obtained when the dyestuffs are applied to cellulose textile materials in conjunction with a treatment with an acid-binding agent.

| Example | Aminoanthraquinone | Heterocyclic Compound | Shade |
|---|---|---|---|
| 164 | 1-amino-4-[4′-4′-aminophenylazo)anilino]-anthraquinone-2:5:2′-trisulphonic acid. | 2-mercaptobenzthiazole | Yellowish-green. |
| 165 | ----do---- | 2-mercaptobenzselenazole | Do. |
| 166 | ----do---- | 2-mercaptobenzoxazole | Do. |
| 167 | 1-amino-4-(4′-aminoanilino)anthraquinone-2:5:3′-trisulphonic acid | 2-mercaptobenzthiazole-5-carboxylic acid | Blue. |
| 168 | ----do---- | 2-mercaptobenzthiazole-6-sulphonic acid | Do. |
| 169 | 1-amino-4-(3′-aminoanilino)anthraquinone-2:4′-disulphonic acid | ----do---- | Reddish-blue. |
| 170 | ----do---- | 2-mercaptobenzselenazole | Do. |
| 171 | ----do---- | 2-mercaptobenzthiazole-5-carboxylic acid | Do. |

EXAMPLE 172

19.7 parts of copper phthalocyanine-3-sulphon-N-(3′-aminophenyl)amide sulphonamide sulphonic acid (which may be obtained as described below) are suspended in 400 parts of water and a 2 N aqueous solution of sodium hydroxide is added until a clear solution is obtained and the pH of the solution is 7. The solution is cooled to between 0° and 5° C. and the solution of 3.88 parts of cyanuric chloride in 20 parts of acetone is then added. The mixture is stirred for 30 minutes at a temperature between 0° and 5° C. whilst maintaining the pH of the mixture between 6.5 and 7 by the addition of a 2 N aqueous solution of sodium carbonate. A solution of 3.8 parts of the sodium salt of 2-mercaptobenzthiazole in 50 parts of water is then added and the mixture is slowly heated to a temperature of 40° C. and maintained at this temperature for 2 hours, whilst maintaining the pH of the mixture between 6.5 and 7.0 by the addition of a 2 N aqueous solution of sodium carbonate. 150 parts of sodium chloride are then added and the precipitated dyestuff is filtered off and dried.

When applied to cellulose textile materials by a printing process the dyestuff yields bright greenish-blue prints possessing excellent fastness to wet treatments.

The copper phthalocyanine-3-sulphon-N-(3′-aminophenyl) amide sulphonamide sulphonic acid used in the above example may be obtained as follows:

115.2 parts of copper phthalocyanine are slowly added with stirring to 540 parts of chlorosulphonic acid and the mixture is then stirred for 3 hours at a temperature between 140° C. to 145° C. The mixture is cooled to 80° C., 100 parts of thionyl chloride are added and the mixture is then stirred for 2 hours at a temperature of 85° C. The mixture is cooled to 20° C., poured onto ice and the precipitated phthalocyanine sulphonchloride is filtered off and washed with 1000 parts of a 1% aqueous solution of hydrochloric acid which has been cooled to 0° C.

The solid sulphonchloride so obtained is stirred with 1000 parts of water and 600 parts of ice and 30 parts of m-aminoacetanilide are then added. The pH of the resultant mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at a temperature of 50° C. until no further additions of ammonium hydroxide solution are required to maintain the pH at 8. 500 parts of a concentrated aqueous solution of hydrochloric acid are then added and the mixture is stirred for 4 hours at a temperature of 90° C. The mixture is then cooled to 20° C. and the precipitated solid is filtered off, washed with a 1% aqueous solution of hydrochloric acid and dried.

EXAMPLE 173

In place of the 19.7 parts of copper phthalocyanine-3-sulphon - N - (3' - aminophenyl)amide sulphonamide sulphonic acid used in Example 172 there are used 19.7 parts of copper phthalocyanine - 3 - sulphon - N - (4'-aminophenyl)amide sulphonamide sulphonic acid when a dyestuff having similar properties is obtained.

The copper phthalocyanine 3 - sulphon - N - (4'-aminophenyl)amide sulphonamide sulphonic acid used in the above Example may be obtained by the method described in Example 172 for the preparation of the isomeric compound except that the 30 parts of m-aminoacetanilide are replaced by 30 parts of p-aminoacetanilide.

EXAMPLE 174

In place of the 3.8 parts of the sodium salt of 2-mercaptobenzthiazole used in Examples 172 or 173 there are used 3.45 parts of the sodium salt of 2-mercaptobenziminazole or 3.46 parts of the sodium salt of 2-mercaptobenzoxazole when similar dyestuffs are obtained.

EXAMPLE 175

In place of the 19.7 parts of copper phthalocyanine-3-sulphon-N-(3'-aminophenyl)amide sulphonamide sulphonic acid used in Example 172 there are used 19.7 parts of copper phthalocyanine - 4 - sulphon - N - (3' - aminophenyl)amide sulphonamide sulphonic acid when a similar dyestuff is obtained.

The copper phthalocyanine - 4 - sulphon-N-[3'-aminophenyl]amide sulphonamide sulphonic acid used in the above example may be obtained as follows:

196.8 parts of the tetrasodium salt of copper phthalocyanine tetra - 4 - sulphonic acid are slowly added with stirring to 970 parts of chlorosulphonic acid and the mixture is then stirred for 3 hours at a temperature between 115° C. and 120° C. The mixture is cooled to a temperature of 80° C., 100 parts of thionyl chloride are added and the mixture is stirred for 2 hours at a temperature between 115° and 120° C. The mixture is then cooled to 20° C., poured onto ice, and the precipitated phthalocyanine sulphonchloride is filtered off, and washed with 1000 parts of a 10% aqueous solution of hydrochloric acid which has been cooled to 0° C.

The sulphonchloride so obtained is stirred with 1000 parts of water and 600 parts of ice and 30 parts of m-aminoacetanilide are then added. The pH of the resulting mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of sodium hydroxide. The mixture is then stirred at a temperature of 50° C. until no further additions of the ammonium hydroxide solution are required to maintain the pH at 8. 500 parts of a concentrated aqueous solution of hydrochloric acid are then added and the mixture is stirred for 4 hours at a temperature of 90° C. The mixture is cooled to 20° C. and the precipitated solid is filtered off, washed with a 1% aqueous solution of hydrochloric acid and dried.

In place of the copper phthalocyanine-4-sulphon-N-[3'-aminophenyl]amide sulphonamide sulphonic acid used in the above example there are used equivalent amounts of copper phthalocyanine - 4 - sulphon-N-[3'-amino-4'-(methyl-, chloro- or methoxy)phenyl]amide sulphonamide sulphonic acid whereby similar dyestuffs are obtained.

The said copper phthalocyanines may be obtained as described above except that the 30 parts of m-aminoacetanilide are replaced by 32.8 parts of 3-amino-6-methylacetanilide, or by 36.9 parts of 3-amino-6-chloroacetanilide or by 36.0 parts of 3-amino-6-methoxyacetanilide respectively.

EXAMPLE 176

In place of the solution of 3.8 parts of the sodium salt of 2-mercaptobenzthiazole in 50 parts of water used in Example 172 there is used a solution of 7.6 parts of the sodium salt of 2-mercaptobenzthiazole in 75 parts of water and instead of maintaining the reaction mixture for 2 hours at a temperature of 40° C. the reaction mixture is maintained for 12 hours at a temperature of 90° C., when a similary dyestuff is obtained.

EXAMPLE 177

100 parts of bleached cotton fabric are padded through an aqueous solution containing 1% of the dyestuff of Example 1, 1% of sodium bicarbonate and 0.2% of an alkylated phenol/ethylene oxide condensate, at a temperature of 18° C., and the cotton fabric is then squeezed between rollers until its weight is 200 parts. The cotton fabric is dried at 70° C. and is then exposed to steam at a temperature of 102° C. for 1 minute. The coloured cotton fabric is then rinsed in water, immersed for 15 minutes in a 0.2% aqueous solution of soap, rinsed again in water and finally dried.

The cotton fabric is thereby coloured a bright bluish-red shade possessing excellent fastness to washing.

In place of the 1% of the dyestuff of Example 1 used in the above example there is used 1% of the dyestuff of Example 3 or 1% of the dyestuff of Example 4 or 1% of the dyestuff of Example 11 or 1% of the dyestuff of Example 25 whereby the cotton fabric is coloured in bright blue, bright yellow, bright bluish-red and bright yellow shades respectively, which possess excellent fastness to washing.

EXAMPLE 178

100 parts of bleached cotton yarn are immersed in a dyebath comprising 2 parts of the dyestuff of Example 1 and 90 parts of sodium chloride dissolved in 3000 parts of water and dyeing is carried out for 30 minutes at a temperature of 20° C. 5 parts of trisodium phosphate are then added and dyeing is continued for 60 minutes at 20° C. The dyed cotton yarn is then removed from the dyebath, rinsed in water, immersed for 5 minutes in a 0.2% aqueous solution of a synthetic detergent at a temperature of 100° C., rinsed again in water and finally dried. The cotton yarn is dyed a bright bluish-red shade which is fast to washing.

In place of the 2 parts of the dyestuff of Example 1 used in the above example there are used 2 parts of the dyestuff of Example 30, or 2 parts of the dyestuff of Example 27 or 2 parts of the dyestuff of Example 131 whereby the cotton yarn is dyed in bright scarlet, bright orange and bright yellow shades respectively, which possess excellent fastness to washing.

EXAMPLE 179

100 parts of bleached cotton fabric are padded through an aqueous solution containing 0.2% of the dyestuff of Example 1 and 2% of sodium carbonate and the cotton fabric is then passed between rollers until its weight is 200 parts. The cotton fabric is then rolled up and stored for 4 hours at a temperature of 20° C. The cotton fabric is then rinsed in water, immersed for 5 minutes in a 0.2% aqueous solution of a synthetic detergent at a temperature of 100° C., rinsed again in water and dried. The cotton fabric is coloured a bright red shade possessing excellent fastness to washing.

EXAMPLE 180

100 parts of woollen cloth are immersed in a dyebath comprising a solution of 1.5 parts of the dyestuff of Example 30, 3.0 parts of ammonium acetate, 0.5 part of cetyltrimethylammonium bromide and 1.0 part of a condensate of ethylene oxide with a fatty alcohol in 5000 parts of water, and dyeing is carried out for 1 hour at a temperature of 100° C. The dyed woollen cloth is then removed from the dyebath, rinsed in water and dried.

The woollen cloth is dyed a scarlet shade possessing excellent fastness to washing.

EXAMPLE 181

A print paste comprising:

| | Parts |
|---|---|
| The dyestuff of Example 5 | 3 |
| Urea | 10 |
| Water | 50.8 |
| Sodium bicarbonate | 1.2 |
| 4% aqueous solution of sodium alginate | 35 |
| | 100 | is applied to unmercerised cotton cloth by machine printing. The printed cotton cloth is dried at a temperature of 70° C. and is then steamed for 6 minutes at a temperature of 100° C. The printed cotton cloth is then rinsed in water, immersed for 10 minutes in a 0.3% aqueous solution of a synthetic detergent at a temperature of 100° C., rinsed again in water and finally dried.

The cotton cloth is thereby printed a rubine shade which possesses excellent fastness to wet treatments.

In place of the unmercerised cotton cloth used in the above example there may be used mercerised sateen cloth or viscose rayon cloth when brown prints are also obtained which possess excellent fastness to wet treatments.

In place of the 3 parts of the dyestuff of Example 92 used in the above example there are used 3 parts of the dyestuff of Example 1, or 3 parts of the dyestuff of Example 90 or 3 parts of the dyestuff of Example 125 or 3 parts of the dyestuff of Example 113 or 3 parts of the dyestuff of Example 131 whereby there are obtained red, navy-blue, red, blue and yellow prints respectively which possess excellent fastness to washing.

EXAMPLE 182

100 parts of mercerised bleached cotton material are padded through an aqueous solution containing 2.0% of the dyestuff of Example 1, 10% of dimethylolglyoxalmonourein, 1.0% of N:N-di(β-hydroxyethyl)amine hydrochloride, 1.0% of methylol stearamide and 0.5% of sodium triisopropylnaphthalene sulphonate, and the cotton material is then squeezed between rollers until its weight is 200 parts. The cotton material is dried at a temperature of 70° C. and is then baked for 3 minutes at a temperature of 155° C. The cotton material is then rinsed in water, immersed for 5 minutes in a boiling aqueous solution containing 0.5% of sodium carbonate and 0.1% of a mixture of an alkylated phenol/ethylene oxide condensate and a sulphated fatty alcohol, rinsed again in water and finally dried.

The cotton material is coloured a bright bluish-red shade which possesses excellent fastness to light and to wet treatments and the cotton material is resistant to creasing.

EXAMPLE 183

100 parts of a bleached mercerised cotton poplin are padded through an aqueous solution containing 1.0% of the dyestuff of Example 120, 10% of trimethylolmelamine, 1.5% of N-(β-hydroxyethyl)-N-(β-hydroxy-n-butyl)amine hydrochloride, 1.0% of methylolstearamide, 0.3% of sodium triisopropylnaphthalene sulphonate and 0.3% of sodium chloride and the cotton poplin is then squeezed between rollers until its weight is 200 parts. The cotton poplin is dried at a temperature of 65° C. and is then baked for 3 minutes at a temperature of 150° C. The cotton poplin is then rinsed in water, immersed for 5 minutes in a boiling aqueous solution containing 0.5% of sodium carbonate and 0.1% of a mixture of an alkylated phenol/ethylene oxide condensate and a sulphated fatty alcohol, rinsed again in water and finally dried.

The cotton poplin is coloured a bright orange shade which possesses excellent fastness to light and to wet treatments and the cotton poplin is resistant to creasing.

What we claim is:

1. Dyestuffs of the formula:

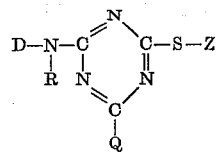

wherein:
D represents a chromophoric dyestuffs radical selected from the class consisting of the azo, anthraquinone, nitro, and phthalocyanine chromophoric dyestuffs radicals and wherein the nitrogen atom N is attached to a carbon atom of said dyestuff radical;
R represents a member selected from the class consisting of hydrogen, cycloalkyl, and lower alkyl radicals;
Z represents the radical of a heterocyclic compound in which the heterocyclic ring contains 5 to 6 atoms and the sulfur atom S is attached to a carbon atom of the heterocyclic ring which is in turn directly linked to a hetero atom of the said heterocyclic ring selected from the class consisting of oxygen, sulfur, nitrogen, and selenium, and wherein any substituents on carbon atoms present in the said heterocyclic ring are selected from the group consisting of methyl radicals, and the carbon atoms necessary to form a fused aromatic ring selected from benzene and naphthalene rings, and any substituents on the aromatic ring are selected from methyl, methoxy, nitro, acetylamino, chlorine, carboxylic acid, and sulfonic acid; and
Q is selected from the class consisting of —S—Z, chlorine, bromine, lower alkyl mercapto, phenylmercapto, lower alkyl, phenyl, hydroxy, lower alkoxy, phenoxy, amino, lower alkyl amino, di-(lower alkyl)amino, anilino, sulfoanilino, carboxyanilino, disulfoanilino, carboxysulfoanilino, and N,N-di(lower alkyl)dithiocarbamyl.

2. Dyestuffs having the formula:

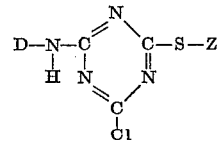

wherein
D represents an azo dyestuff radical and
Z represents a benzthiaz-2-yl radical.

3. Dyestuffs having the formula:

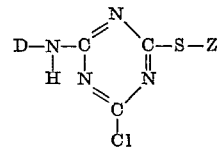

wherein
D represents an anthraquinone dyestuff radical, and
Z represents a benzthiaz-2-yl radical.

4. Dyestuffs having the formula:

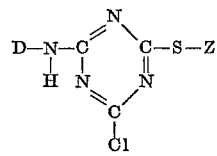

wherein
  D represents a phthalocyanine dyestuff radical, and
  Z represents a benzthiaz-2-yl radical.
5. Dyestuffs having the formula:

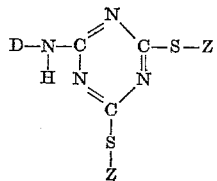

wherein
  D represents an azo dyestuff chromophoric group, and
  Z represents a benzthiaz-2-yl radical.

6. Dyestuffs having the formula:

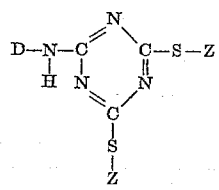

wherein
  D represents an anthraquinone dyestuffs radical, and
  Z represents a benzthiaz-2-yl radical.

References Cited in the file of this patent
UNITED STATES PATENTS

| | | |
|---|---|---|
| 2,795,576 | Fasciati | June 11, 1957 |
| 2,950,165 | Hadfield et al. | Aug. 23, 1960 |